United States Patent [19]

Sumal

[11] Patent Number: 4,468,957
[45] Date of Patent: Sep. 4, 1984

[54] APPARATUS FOR MEASURING THE MASS OF A FLOWING MEDIUM

[75] Inventor: Jaihind S. Sumal, Schwieberdingen, Fed. Rep. of Germany

[73] Assignee: Robert Bosch GmbH, Stuttgart, Fed. Rep. of Germany

[21] Appl. No.: 395,876

[22] Filed: Jul. 7, 1982

[30] Foreign Application Priority Data

Aug. 1, 1981 [DE] Fed. Rep. of Germany ....... 3130626

[51] Int. Cl.³ ............................................. G01F 5/00
[52] U.S. Cl. ......................................... 73/118; 73/202
[58] Field of Search ...................... 73/202, 204, 118 A, 73/861.63

[56] References Cited

U.S. PATENT DOCUMENTS

| 1,143,631 | 6/1915 | Keller et al. | 73/861.63 |
| 2,240,119 | 4/1941 | Montgomery et al. | 73/861.63 |
| 3,443,434 | 5/1969 | Baker et al. | 73/202 |
| 3,559,482 | 2/1971 | Baker et al. | 73/202 |
| 4,373,387 | 2/1983 | Nishimura et al. | 73/118 A |
| 4,381,668 | 5/1983 | Sato et al. | 73/202 |

Primary Examiner—Herbert Goldstein
Attorney, Agent, or Firm—Edwin E. Greigg

[57] ABSTRACT

An apparatus for measuring the mass of a flowing medium, in particular, for measuring the aspirated air mass in internal combustion engines. The apparatus includes a flow conduit for the medium, embodied as an air intake tube and having a restricted section, into which a bypass line toward the restricted section discharges at a mouth. In the bypass line there is a temperature-dependent resistor, which ascertains the mass of air flowing via the bypass line, this mass being at a predetermined proportion to that flowing through the flow conduit of the medium, and this resistor via an electronic control unit triggers a fuel-injection valve in the flow conduit of the medium. The course of the flow across section in the restricted section is determined by way of example by a shaped body surrounding the fuel injection valve. The mouth of the bypass line is located at the narrowest flow cross section of the restricted section, while downstream of the narrowest cross section and adjacent thereto, the flow cross section is enlarged by an amount which corresponds to the bypass line cross section at the mouth. As a result, undesirable falsification of the measurement signal at the temperature-dependent resistor which might be caused by pulsations in the air flow is prevented.

4 Claims, 4 Drawing Figures

APPARATUS FOR MEASURING THE MASS OF A FLOWING MEDIUM

BACKGROUND OF THE INVENTION

The invention relates to an apparatus for measuring the mass of a flowing medium, and, in particular, to an apparatus for measuring the aspirated air mass in an internal combustion engine. The apparatus includes a flow conduit for the medium which has a restricted section, and a bypass line which has a mouth connected to the restricted section of the flow conduit, through which a mass of the medium flows which is at a predetermined proportion with respect to a mass of the medium flowing through the flow conduit and discharges into the restricted section of the flow conduit. In this apparatus, the temperature and/or resistance of at least one temperature-dependent resistor disposed within the bypass line is regulated in accordance with the flowing mass of medium, wherein the control variable of the temperature-dependent resistor is a standard for the flowing mass of medium.

Such an apparatus for measuring the mass of a flowing medium is already known; however, when this known apparatus is used for measuring the mass of air aspirated by an internal combustion engine, the pulsations in the aspirated air, which are particularly pronounced in certain operating ranges, cause a falsification of the measurement signal. This is particularly caused by the fact that in a restricted section, such as Venturi or a nozzle in the air intake tube of the engine, the pressure drop is greater with a pulsating flow than with a flow which is free of pulsation. Since the mass of air flowing through the bypass line is dependent on the pressure drop in the restricted section, measurement errors result from the pressure drop dependent upon the pulsation, since the signal generated by the air meter is not only a function of the aspirated air mass but also a function of the amplitude of the pulsation.

SUMMARY OF THE INVENTION

In the apparatus for measuring the mass of a flowing medium, according to the invention, the restricted section of the flow conduit has a flow cross section such that, in the flow direction, it is enlarged to the least extent at the mouth of the bypass line and thereafter by an amount which corresponds to the bypass line cross section at its mouth. This apparatus according to the invention has the advantage over the prior art that the falsifying effect on the result of measurement is at the least reduced greatly.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
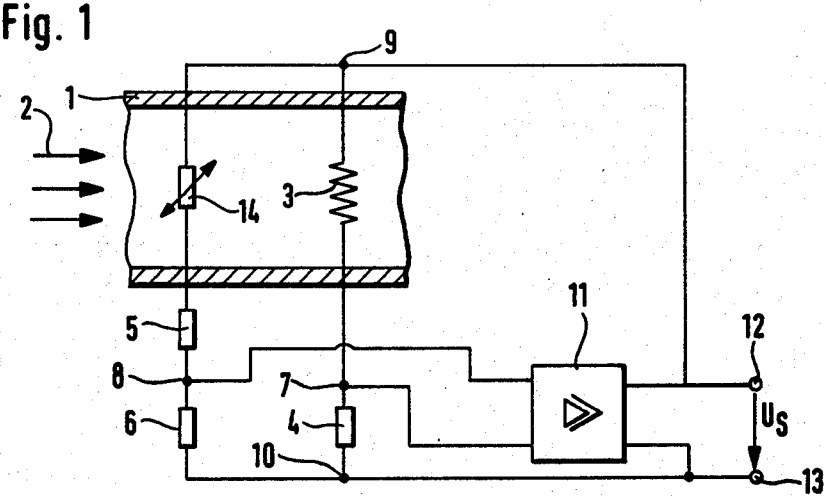
FIG. 1 shows a circuit diagram of an apparatus for measuring the mass of a flowing medium.
Figure 2:
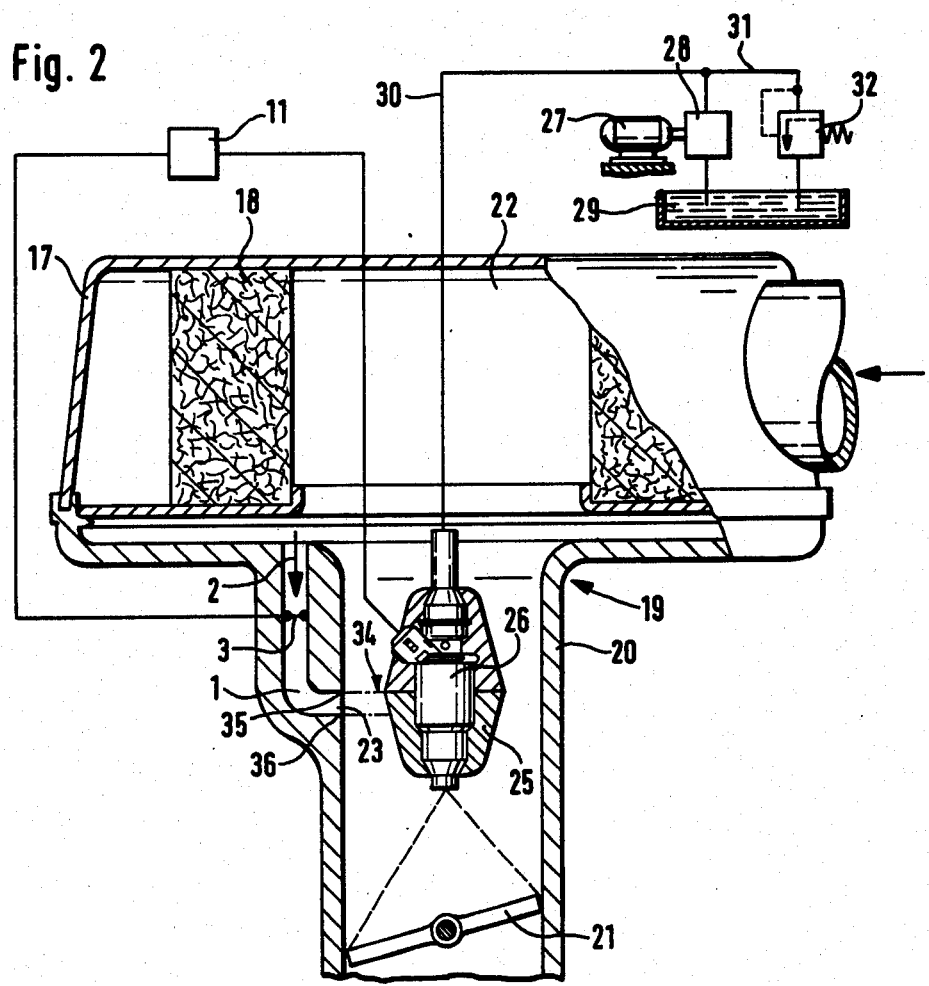
FIG. 2 is a schematic illustration of a fuel-injection system having a first exemplary embodiment of an apparatus for measuring the mass of a flowing medium, for instance, the mass of air aspirated by an internal combustion engine
Figure 3:
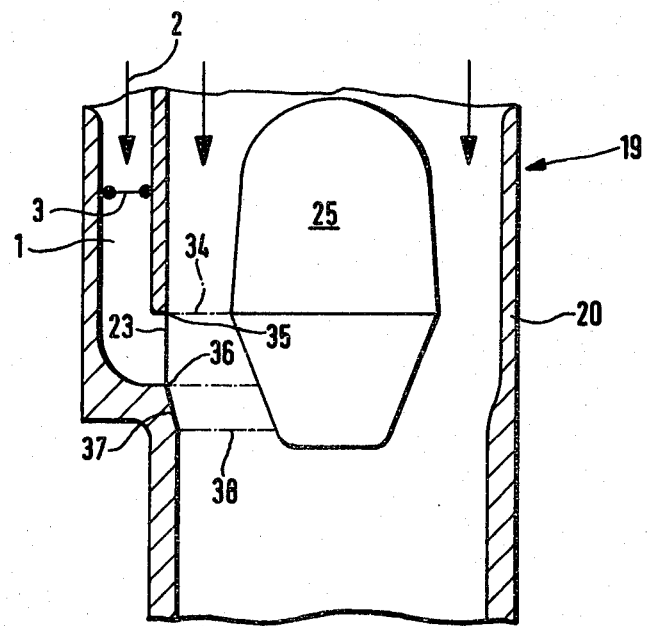
FIG. 3 shows a second exemplary embodiment of an apparatus for measuring the mass of a flowing medium.
Figure 4:
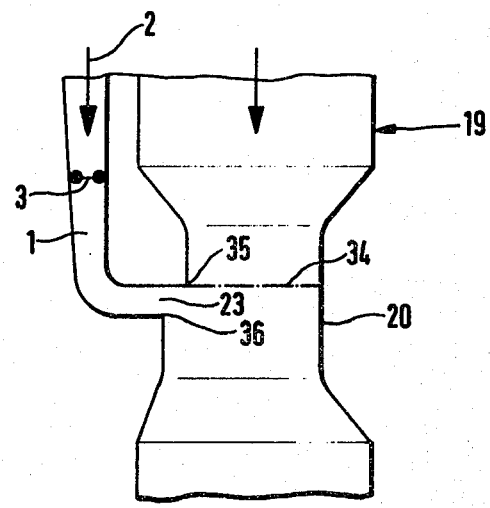
FIG. 4 shows a third exemplary embodiment of an apparatus for measuring the mass of a flowing medium.

In FIG. 1 a flow cross-section 1, for instance a bypass line such as that shown in FIGS. 2-4, is shown, in which a medium, for instance a portion of the air aspirated by an internal combustion engine, flows in the direction of the arrows 2. A temperature-dependent resistor 3, for instance a hot coating or film resistor or a hot wire, is located in this flow cross section 1 and experiences the flow through it of the outlet variable of a regulator, simultaneously furnishing the input variable for the regulator. The temperature of the temperature-dependent resistor 3 is adjusted by the regulator to a fixed value which is above the average air temperature. Now if the flow velocity, that is, the mass of air aspirated per unit of time, increases, then the temperature-dependent resistor 3 cools down to a greater extent. This cooling is fed back to the input of the regulator so that the output variable of the regulator is increased to such an extent that the fixed temperature value is again established at the temperature-dependent resistor 3. The output variable of the regulator adjusts the temperature of the temperature-dependent resistor 3 to the predetermined value whenever there are changes in the mass of aspirated air and at the same time represents a standard for the mass of aspirated air which can be fed as a measurement variable to a metering circuit at the internal combustion engine for adapting the required mass of fuel to the mass of air aspirated per unit of time.

Together with a resistor 4, the temperature-dependent resistor 3 forms a first bridge branch, and a second bridge branch comprising the two fixed resistors 5 and 6 is connected in parallel to it. One pick-up point 7 is located between the resistors 3 and 4, and another pick-up point 8 is located between resistors 5 and 6. The two bridge branches are connected in parallel at points 9 and 10. The diagonal voltage of the bridge appearing between points 7 and 8 is supplied to the input of an amplifier 11, to the output terminals of which the points 9 and 10 are connected, so that its output variable supplies the bridge with operating voltage or operating current. The output variable, symbolized as the control variable $U_s$, can be picked up between the terminals 12 and 13, as shown in FIG. 1. The control variable $U_s$ controls the metering of the fuel required for the aspirated air, for instance, in a fuel metering circuit, not shown, of an engine. The temperature-dependent resistor 3 is heated by the current flowing through it up to a value at which the input voltage of the amplifier 11, that is, the bridge diagonal voltage, becomes zero or assumes a predetermined value. A specific current then flows from the output of the amplifier into the bridge circuit. If a change in the mass of aspirated air causes the temperature of the temperature-dependent resistor 3 to change, then the voltage at the bridge diagonal also changes and the amplifier 11 controls the bridge supply voltage or bridge current to a value at which the bridge is again balanced or is imbalanced in a predetermined manner. The output variable of the amplifier 11, the control voltage $U_s$, like the current in the temperature-dependent resistor 3, represents a standard for the mass of aspirated air.

In order to compensate for the influence of temperature of the aspirated air on the result of measurement, it may be efficaceous to include a second resistor 14, which experiences the flow around it of aspirated air, in the second bridge branch. The size of the resistors 5, 6 and 14 should be selected such that the lost output of the temperature-dependent resistor 14, caused by the branch current flowing through it, is low enough that the temperature of this resistor 14 will virtually not vary with variations in the bridge voltage by rather always corresponds to the temperature of the aspirated air flowing around it.

As shown in FIG. 2, the apparatus for measuring the mass of a flowing medium can be used for controlling a fuel supply system for internal combustion engines. In the exemplary embodiment shown in FIG. 2, the combustion air flows in the direction of the arrow through an annular air filter 18 disposed in a housing 17 and into a flow conduit for the medium formed by an air intake tube 19. One or more cylinders, not shown, of a mixture-compressing internal combustion engine having externally supplied ignition communicates with this flow conduit for the medium. Near the air filter 18, the air intake tube 19 includes therein a coaxially disposed shaped body 25 which in combination therewith forms a restricted section 20 which in particular has a flow cross section taking a Venturi-like course for the aspirated air. Downstream of the restricted section 20 there is a throttle device which is embodied as a throttle valve 21 and is arbitrarily actuatable. The bypass line 1 branches off toward the restricted section 20 from the hollow chamber 22 in the interior of the air filter 18 and the upstream side of its mouth 23 is located at the narrowest flow cross section 34 of the restricted section 20. A mass of air which is set at a predetermined proportion with respect to the mass of air flowing through the air intake tube 19 flows through the bypass line 1. The temperature-dependent resistor 3, whose temperature and resistance values are regulated in accordance with the aspirated air mass, serves the purpose of ascertaining the mass of air aspirated by the engine. The flow cross section for the aspirated air is determined in the restricted section 20 by the contour of the coaxially disposed shaped body 25, by way of example, which surrounds a fuel-injection valve 26. The fuel-injection valve 26 is triggered in accordance with the aspirated air mass and other operating variables in the engine, such as temperature, rpm, load, exhaust gas composition, and others. The fuel supply of the fuel-injection valve 26 is effected by way of example by a fuel-pump 28 driven by an electric motor 27. The fuel pump 28 aspirates fuel from a fuel container 29 and delivers it via a fuel supply line 30 to the fuel injection valve 26. A line 31 in which a pressure regulating valve 32 is disposed branches off from the fuel supply line 30 and by way of this line 31 fuel can flow back to the fuel container 29.

In accordance with the invention, the mouth 23 of the bypass line 1 is located at the narrowest flow cross section 34 of the restricted section 20; preferably, the upper edge 35 of the mouth 23 pointing upstream is at approximately the same level as the narrowest cross section 34. As a result, the greatest pressure difference for the air flow through the bypass line 1 is available for attaining a maximally high measurement signal at the temperature-dependent resistor 3. In order to prevent pulsation from influencing the measurement signal, the flow cross section for the aspirated air is widened in accordance with the invention downstream of the narrowest cross section 34 by an amount which corresponds to the bypass line cross section at the mouth 23 that is, the length of the spacing along line 34 plus a measure of the diameter of the mouth 23 is approximately equal to the spacing between the wall of the intake tube 19 and the end of the shaped body 25 downstream of the mouth 23. The branching off of the bypass line 1 from the hollow chamber 22 in the air filter 18, where there are few pulsations, and the widening of the flow cross section at the mouth 23 of the bypass line in accordance with the invention result in a virtually pulsation-free flow in the bypass line 1. The widening of the flow cross section in the restricted section 20 downstream of the narrowest cross section 34 by the amount of the bypass line cross section at the mouth 23 can be accomplished continuously beginning at the level of the upper edge 35 of the mouth and down to the downstream lower edge 36 of the mouth 23 or may be effected abruptly directly downstream of the narrowest flow cross section 34.

In the exemplary embodiment of FIGS. 3 and 4, elements which remain the same as and function the same as those in FIGS. 1 and 2 are identified by the same reference numerals. In the exemplary embodiment of FIG. 3, a widening of the flow cross section is again provided, as in the exemplary embodiment of FIG. 2, downstream of the narrowest cross section 34 of the restricted section 20, the widening being effected by the amount of the bypass line cross section at the mouth 23. This section is followed by a section 37 of the restricted section 20 in which, while the same flow cross section is maintained as at the lower edge 36 of the mouth 23, the walls of the restricted section 20 and of the shaped body 25 extend parallel to one another as far as the dot-dash line 38.

In the exemplary embodiment shown in FIG. 4, the restricted section 20 is formed by the wall of the air intake tube 19. The narrowest flow cross section 34 is provided at the upper edge 35 of the mouth 23 of the bypass line 1, while downstream of the narrowest flow cross section 34 an abrupt or continuous widening of the flow cross section by the amount of the bypass line cross section at the mouth 23 is effected.

If restriction of the flow cross section exists in the bypass line 1 and the flow conduit 19 for the medium, then with different pulsation amplitude the proportions between the air masses flowing through the bypass line 1 and through the flow conduit 19 for the medium differ from one another in an undesirable way. The result is that the temperature-dependent resistor 3 will produce a false measurement result. Such restriction could have a nozzle shape or a Venturi shape, by way of example. An error in measurement of this kind can be made smaller by providing that such a restriction in the bypass line 1 and/or in the flow conduit 19 of the medium, will have only a converging section and not a diverging section. For instance, the bypass line 1 in FIG. 4 is shown with a flow cross section which continuously decreases in the direction toward the mouth 23, while the transition downstream of the mouth 23 takes the form of a stepped widening.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. In an apparatus for measuring the mass of a flowing medium, which includes a flow conduit for the medium which has a restricted section, a bypass line which has a mouth connected to said restricted section and through which a mass of the medium flows which is at a predetermined proportion with respect to a mass of the medium flowing through the flow conduit and discharges from said mouth into said restricted section, at least one temperature-dependent resistor disposed in the bypass line, and a regulating means for regulating the temperature and/or resistance of the at least one temperature-dependent resistor, in accordance with the flowing mass of medium wherein a control variable of the at least one temperature-dependent resistor, is a standard for the flowing mass of medium, the improvement wherein said restricted section includes a shaped body which experiences a medium flow around it, said shaped body being disposed coaxially within the said flow conduit to form said restricted section of the flow conduit for the medium and is embodied such that the flow cross section of the medium in the flow direction becomes smaller up to the mouth of the bypass line and beyond the mouth of the bypass line widens by an amount which corresponds to the bypass line cross section at the mouth, and said shaped body is embodied such that the widening of the flow cross section for the medium by the amount of the bypass line cross section at the mouth of the bypass line is effected over a length extending from an upper edge to a lower edge of the mouth in the flow direction.

2. An apparatus as defined by claim 1 in which the shaped body surrounds a fuel injection valve.

3. An apparatus as defined by claim 2, wherein downstream of the mouth of the bypass line, a section of the flow conduit of the medium is provided in which, while the same flow cross section for the medium is maintained, the wall of the flow conduit for the medium and the wall of the shaped body extend parallel to one another.

4. An apparatus as defined by claim 1 in which the restricted section is formed by a course of the wall of the medium flow conduit and said shaped body which is approximately Venturi-like in shape, the flow cross section for the medium of which is reduced in the flow direction up to the mouth of the bypass line and beyond the mouth of the bypass line is widened by an amount which corresponds to the bypass line cross section at the mouth.

* * * * *